(12) United States Patent
Kazama (10) Patent No.: US 11,038,981 B2
(45) Date of Patent: Jun. 15, 2021

(54) SERVER, INFORMATION PROCESSING SYSTEM, AND CLIENT TERMINAL (71) Applicant: SATO HOLDINGS KABUSHIKI KAISHA, Tokyo (JP)

(72) Inventor: Satoshi Kazama, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/573,573

(22) PCT Filed: Aug. 3, 2016

(86) PCT No.: PCT/JP2016/072786
§ 371 (c)(1),
(2) Date: Nov. 13, 2017

(87) PCT Pub. No.: WO2017/168775
PCT Pub. Date: Oct. 5, 2017

(65) Prior Publication Data
US 2018/0091622 A1    Mar. 29, 2018

(30) Foreign Application Priority Data
Mar. 31, 2016   (JP) .............................. JP2016-072242

(51) Int. Cl.
*H04L 29/08*    (2006.01)
*G06F 13/00*    (2006.01)
(Continued)

(52) U.S. Cl.
CPC .............. *H04L 67/32* (2013.01); *G06F 13/00* (2013.01); *H04L 43/0805* (2013.01);
(Continued)

(58) Field of Classification Search
CPC ....... H04L 65/607; H04L 47/62; H04L 43/10; H04L 43/0811; H04L 43/0817;
(Continued)

(56) References Cited

U.S. PATENT DOCUMENTS 5,987,523 A * 11/1999 Hind ...................... G06F 9/465
709/245
6,269,330 B1    7/2001 Cidon et al.
(Continued)

FOREIGN PATENT DOCUMENTS

| CN | 1852176 A | 10/2006 |
| EP | 0 883 271 A2 | 12/1998 |

(Continued)

OTHER PUBLICATIONS

Extended European Search Report, dated Feb. 22, 2019, 7 pages.
Chinese Office Action and English translation, Application No. 201680024472.8, dated Apr. 3, 2020, 15 pages.

*Primary Examiner* — Patrice L Winder
*Assistant Examiner* — Aye M Aung
(74) *Attorney, Agent, or Firm* — Foley & Lardner LLP (57) ABSTRACT A server configured to accept a request from a client terminal includes a storage configured to store a description file including a script to cause the client terminal to perform a confirmation process to confirm availability of access to a predetermined host server with a predetermined port number, and a unit configured to transmit the description file stored in the storage to the client terminal based on the request.

2 Claims, 12 Drawing Sheets (51) Int. Cl.
*H04L 12/26* (2006.01)
*H04L 29/06* (2006.01)

(52) U.S. Cl.
CPC .............. *H04L 43/50* (2013.01); *H04L 67/06* (2013.01); *H04L 67/1097* (2013.01); *H04L 67/28* (2013.01); *H04L 67/34* (2013.01); *H04L 67/42* (2013.01)

(58) Field of Classification Search
CPC ......... H04L 43/06; H04L 43/50; H04L 67/32; H04L 43/0805; H04L 67/06; H04L 67/1097; H04L 67/28; H04L 67/34; H04L 67/42; H04J 3/0632; H04N 21/242; H04N 21/4305; H04N 21/44004; H04N 21/44209; H04N 1/64322; G06F 11/2635; G06F 13/00
See application file for complete search history.

(56) References Cited

U.S. PATENT DOCUMENTS

| | | | | |
|---|---|---|---|---|
| 6,687,652 | B2 * | 2/2004 | Mikal | G06F 11/2294 701/31.4 |
| 7,139,840 | B1 * | 11/2006 | O'Toole | H04L 29/12009 709/245 |
| 2002/0133575 | A1 | 9/2002 | Cidon et al. | |
| 2003/0201601 | A1 * | 10/2003 | Koopman | A63F 3/0423 273/146 |
| 2003/0204601 | A1 * | 10/2003 | Takano | H04L 67/14 709/227 |
| 2004/0078471 | A1 * | 4/2004 | Yang | H04L 63/0272 709/227 |
| 2005/0044227 | A1 * | 2/2005 | Haugh | H04L 69/16 709/226 |
| 2011/0219113 | A1 * | 9/2011 | Grewal | G06F 15/16 709/224 |
| 2012/0005336 | A1 * | 1/2012 | Ooba | H04N 1/00244 709/224 |
| 2012/0072548 | A1 * | 3/2012 | Kim | H04L 61/1535 709/219 |
| 2014/0056313 | A1 * | 2/2014 | Wada | H04L 67/145 370/463 |
| 2015/0222604 | A1 * | 8/2015 | Ylonen | H04L 63/08 713/171 |
| 2016/0072693 | A1 * | 3/2016 | Michaelis | H04L 67/42 709/203 |
| 2016/0255139 | A1 * | 9/2016 | Rathod | H04L 51/046 709/203 |
| 2016/0373340 | A1 * | 12/2016 | Bao | H04L 65/4069 |

FOREIGN PATENT DOCUMENTS

| | | |
|---|---|---|
| JP | 2001-519619 A | 10/2001 |
| JP | 2002-229873 A | 8/2002 |
| JP | 2003-198624 A | 7/2003 |
| JP | 2003198624 A * | 7/2003 |
| JP | 2010-124357 A | 6/2010 |

* cited by examiner

SERVER, INFORMATION PROCESSING SYSTEM, AND CLIENT TERMINAL

FIELD

The present invention relates to a server, an information processing system, and a client terminal.

BACKGROUND

Recently, there has been known a method to provide support service for a user-bought product (e.g., a printer) using a host server on the internet.

A client terminal may be connected to an intranet in which the client terminal cannot access to the host server. In particular, when a firewall is set at the intranet, the client terminal is not permitted to access to the host server. Accordingly, a support service provider is required to confirm availability of access from a client terminal of a user to a host server.

Conventionally, there has been known a method to confirm availability of access from a client terminal to a host server on the internet using a function (e.g., Telnet) of an operating system (OS) of the client terminal (see Japanese Patent Application Laid-open No. 2010-124357).

Further, there has been known a method to confirm availability of access to a host server using a function of a web server.

BRIEF SUMMARY

Technical Problem

With the method of Japanese Patent Application Laid-open No. 2010-124357, dedicated commands are required to be input. Accordingly, it is difficult for a user having insufficient technical knowledge to actualize the method of Japanese Patent Application Laid-open No. 2010-124357.

With the method to confirm availability of access from a web server to a host server, availability of access from a client terminal to the host server cannot be confirmed. Accordingly, even when access from the web server to the host server succeeds, access from the client terminal to the host server may fail. That is, success of access from the web server to the host server does not guarantee success of access from the client terminal to the host server.

As described above, in the related art, it is difficult to confirm availability of access from a client terminal to a host server.

An object of the present invention is to facilitate confirming of availability of access from a client terminal to a host server.

Means to Solve Problems

According to one aspect of the present invention, it is provided a server configured to accept a request from a client terminal, comprising:
 a storage configured to store a description file including a script to cause the client terminal to perform a confirmation process to confirm availability of access to a predetermined host server with a predetermined port number; and
 a unit configured to transmit the description file stored in the storage to the client terminal based on the request.

Advantageous Effects

According to the present invention, it can be facilitated to confirm availability of access from a client terminal to a host server.

DETAILED DESCRIPTION

1. Configuration of Information Processing System (FIG. 1)

Description will be provided on a configuration of an information processing system of an embodiment. FIG. 1 is a system configuration diagram of the information processing system of the present embodiment.

Figure 1:
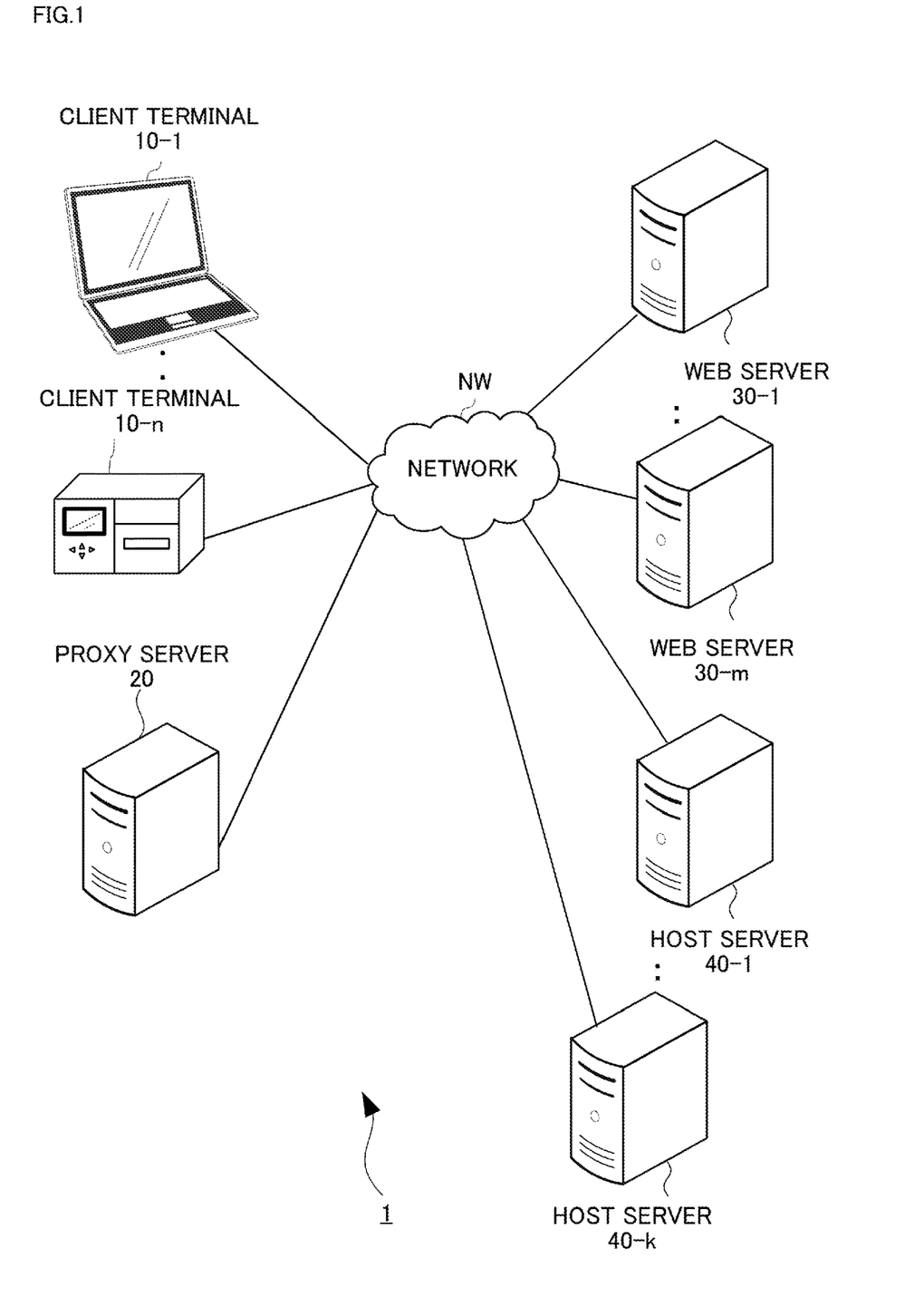
FIG. 1 is a system configuration diagram of the information processing system of the present embodiment.

As illustrated in FIG. 1, an information processing system 1 includes client terminals 10 (10-1 to 10-$n$ ($n$: a positive integer)), a proxy server 20, web servers 30 (30-1 to 30-$m$ ($m$: a positive integer)), and host servers 40 (40-1 to 40-$k$ ($k$: a positive integer)). The client terminals 10, the proxy server 20, the web servers 30, and the host servers 40 (e.g., https communication) can communicate with each other via a network NW. Examples of the network NW include interne, intranet, and combinations thereof.

The client terminal 10 is an example of an information processing apparatus to be used by a user. Examples of the client terminal 10 include a printer (e.g., a label printer or a bar code printer), a smart phone, a tablet terminal, and a personal computer.

The proxy server 20, the web servers 30, and the host servers 40 are examples of an information processing apparatus that performs predetermined processing based on a request transmitted from the client terminal 10.

2. Configuration of Client Terminal and Server (FIGS. 2 and 3)

Description will be provided on the client terminal and servers of the present embodiment. FIG. 2 is a block diagram illustrating a configuration of a client terminal and servers of the present embodiment. FIG. 3 is an outline of a description file of the present embodiment.

Figure 2:
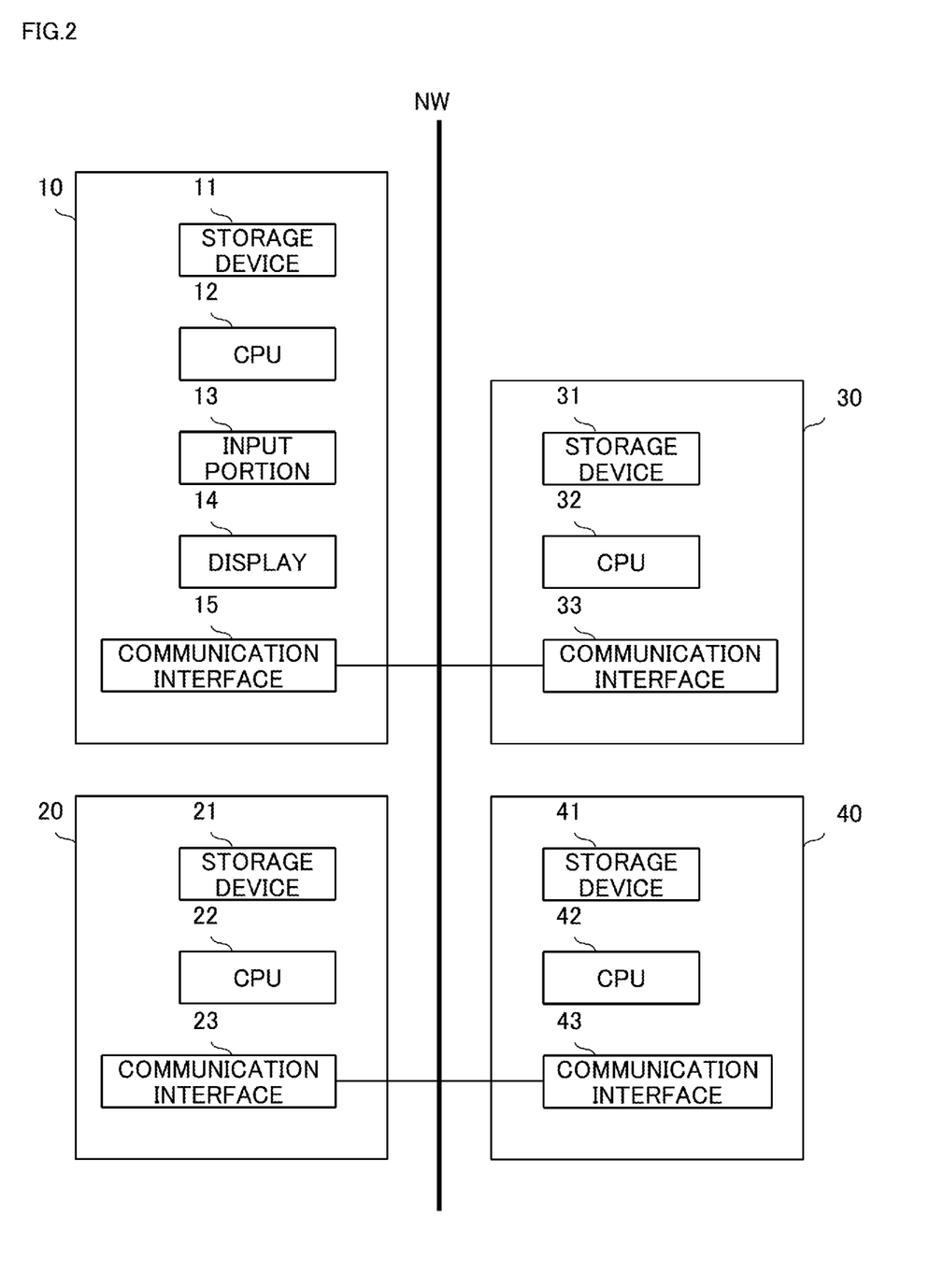
FIG. 2 is a block diagram illustrating a configuration of the client terminal and servers of the present embodiment.
Figure 3:
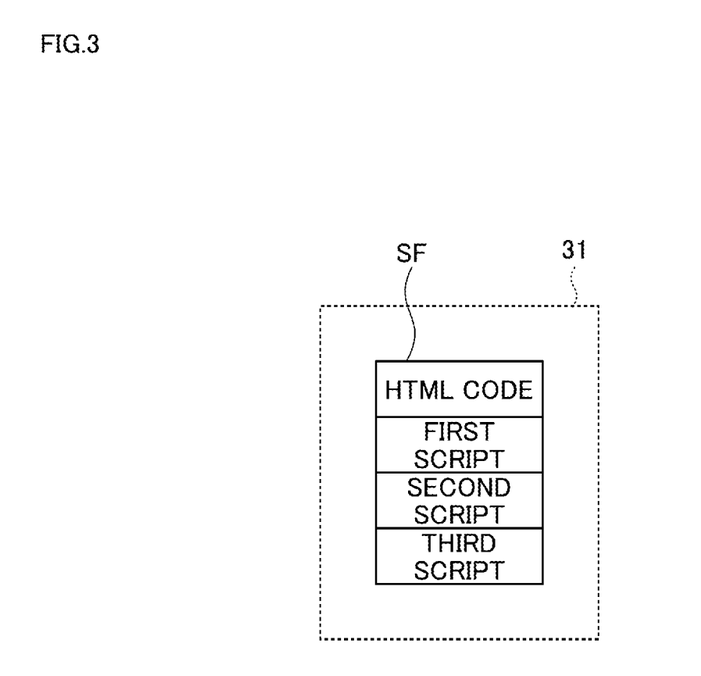
FIG. 3 is an outline of a description file of the present embodiment.

As illustrated in FIG. 2, the client terminal 10 includes a storage device 11, a center processing unit (CPU) 12, an input portion 13, a display 14, and a communication interface 15.

The storage device 11 is configured to store programs and date required for information processing. Examples of the storage device 11 include combinations of a read only memory (ROM), a random access memory (RAM), and storages (e.g., flash memories or hard disks).

Examples of the programs required for information processing include a program of an operating system (OS) and a program of an application (e.g., a browser) for performing information processing.

Examples of the data required for information processing include data retrieved by performing information processing (i.e., results of information processing).

The CPU 12 is configured to actualize functions of an application by executing the program stored in the storage device 11.

The input portion 13 is configured to receive user instructions. Examples of the input portion 13 include a keyboard, a pointing device, and a touch panel.

The display 14 is configured to provide information to a user. For example, the display 14 is a liquid crystal display.

The communication interface 15 is configured to control communication between the client terminal 10 and the network NW.

In a case that the client terminal 10 is a printer, the client terminal 10 further includes a container that contains print media (e.g., labels tentatively stuck on a mount), a platen roller that feeds the print medium contained in the container, and a print head (e.g., a thermal head) that prints on the print medium fed by the platen roller.

The proxy server 20 includes a storage device 21, a CPU 22, and a communication interface 23.

The storage device 21 is configured to store programs, data, and database required for information processing. Examples of the storage device 21 include combinations of a ROM, a RAM, and storages (e.g., flash memories or hard disks). Examples of the programs required for information processing include a program of an OS and a program of an application for actualizing functions of the proxy server 20.

The CPU 22 is configured to actualize functions of the proxy server 20 by executing the program stored in the storage device 21.

The communication interface 23 is configured to control communication between the proxy server 20 and the network NW.

The web server 30 includes a storage device 31, a CPU 32, and a communication interface 33.

The storage device 31 is configured to store programs, data, and database required for information processing. Examples of the storage device 31 include combinations of a ROM, a RAM, and storages (e.g., flash memories or hard disks). Examples of the programs required for information processing include a program of an OS and a program of an application for actualizing functions of the web server 30.

As illustrated in FIG. 3, the storage device 31 also stores a description file SF (e.g., hyper text markup language (HTML) file).

The description file SF includes an HTML code for displaying a screen on the display 14 of the client terminal 10, a first script (e.g., JAVA script (registered trademark)) being an instruction to cause the client terminal 10 to perform test access on a later-mentioned first route, a second script (e.g., JAVA script (registered trademark)) being an instruction to cause the client terminal 10 to perform test access on a later-mentioned second route, and a third script (e.g., JAVA script (registered trademark)) being an instruction to cause the client terminal 10 to perform test access on a later-mentioned third route.

As illustrated in FIG. 2, the CPU 32 is configured to actualize functions of the web server 30 by executing the program stored in the storage device 31. For example, the functions include providing the description file SF to the client terminal 10.

The communication interface 33 is configured to control communication between the web server 30 and the network NW.

The host server 40 is configured to provide support service of a printer being an example of the client terminal 10. The support service enables a user to browse usage history of the printer, manage consumable supplies of the printer, resolve errors of the printer, and the like. A user is required to access the host server 40 from the client terminal 10 in order to utilize such support service.

The host server 40 includes a storage device 41, a CPU 42, and a communication interface 43.

The storage device 41 is configured to store programs, data, and database required for information processing. Examples of the storage device 41 include combinations of a ROM, a RAM, and storages (e.g., flash memories or hard disks). Examples of the programs required for information processing include a program of an OS and a program of an application for actualizing functions of the host server 40.

The CPU 42 is configured to actualize functions of the host server 40 by executing the program stored in the storage device 41.

The communication interface 43 is configured to control communication between the host server 40 and the network NW.

3. Communication Route (FIG. 4)

Description will be provided on communication routes in the present embodiment. FIG. 4 is schematic block diagrams of communication routes in the present embodiment.

In the present embodiment, communication between the client terminal 10 and the host server 40 is performed in accordance with an arbitrary communication protocol (e.g., TCP/IP). For example, the client terminal 10 accesses the host server 40 defined by a host address with a port number defined by TCP/IP.

Figures 4, 4A:
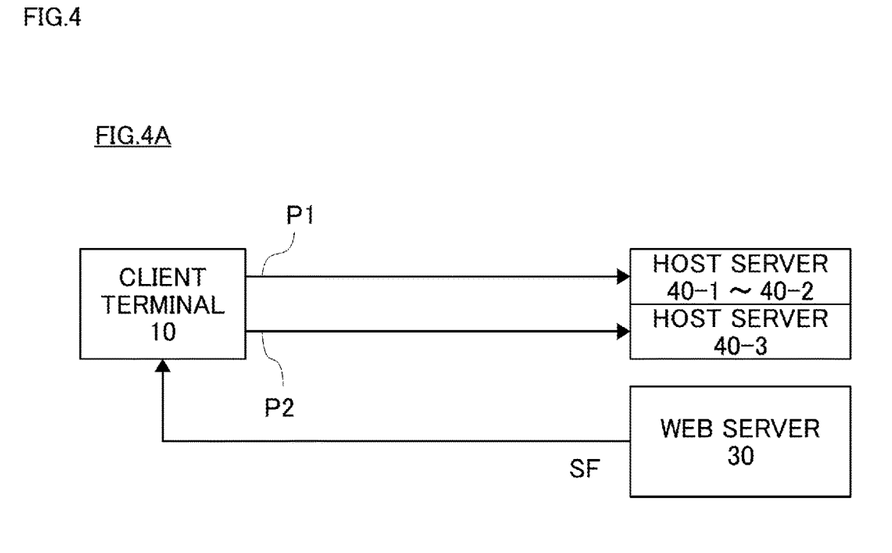
FIG. 4 is schematic block diagrams of communication routes in the present embodiment.

FIG. 4A illustrates the first route.

The client terminal 10 retrieves the description file SF from the web server 30. The first script in the description file SF is an instruction to cause the client terminal 10 to perform test access to the host server 40-1 with a port number P1, test access to the host server 40-2 with the port number P1, and test access to the host server 40-3 with a port number P2.

Figure 4B:
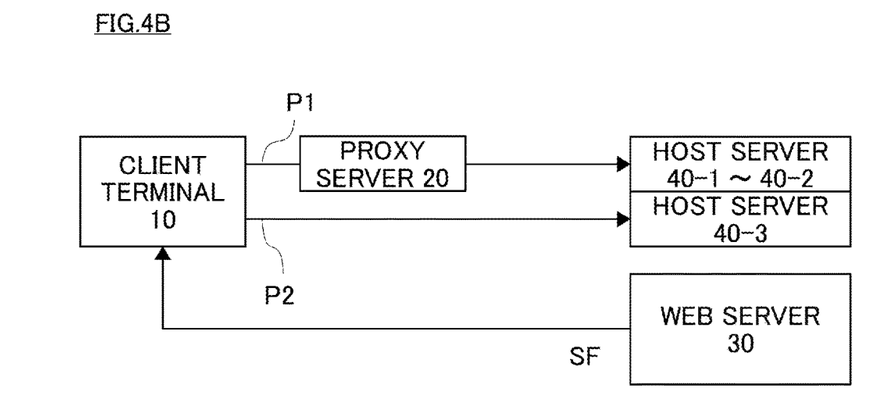

FIG. 4B illustrates the second route.

The client terminal 10 retrieves the description file SF from the web server 30. The second script in the description file SF is an instruction to cause the client terminal 10 to perform test access to the host server 40-1 via the proxy server 20 with the port number P1, test access to the host server 40-2 via the proxy server 20 with the port number P1, test access to the host server 40-3 with the port number P2 without the proxy server 20.

Figure 4C:
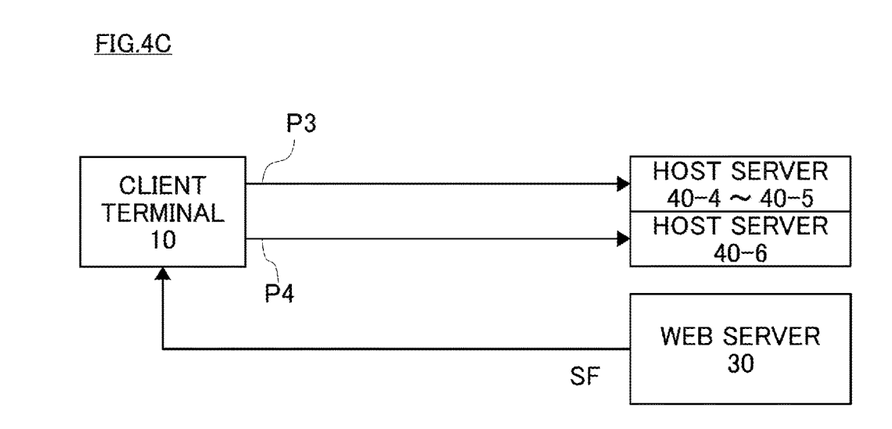

FIG. 4C illustrates the third route.

The client terminal 10 retrieves the description file SF from the web server 30. The third script in the description file SF is an instruction to cause the client terminal 10 to perform test access to the host server 40-4 designated by a user with a port number P3 designated by the user, test access to the host server 40-5 designated by the user with the port number P3 designated by the user, and test access to the host server 40-6 designated by a user with a port number P4 designated by the user.

4. Screen Displayed in Information Processing (FIGS. 5 to 8)

Description will be provided on screens to be displayed in the information processing in the present embodiment. FIGS. 5 to 8 are views illustrating screen examples to be displayed in the information processing of the present embodiment.

Screens of FIGS. 5 to 8 are to be displayed on the display 14 of the client terminal 10. At each screen, a user can provide a user instruction (inputting to an input field and designate a button) using the input portion 13. The provided user instruction is included in a request that is transmitted from the client terminal 10 to the server (the proxy server 20, the web server 30, or the host server 40).

Figure 5:
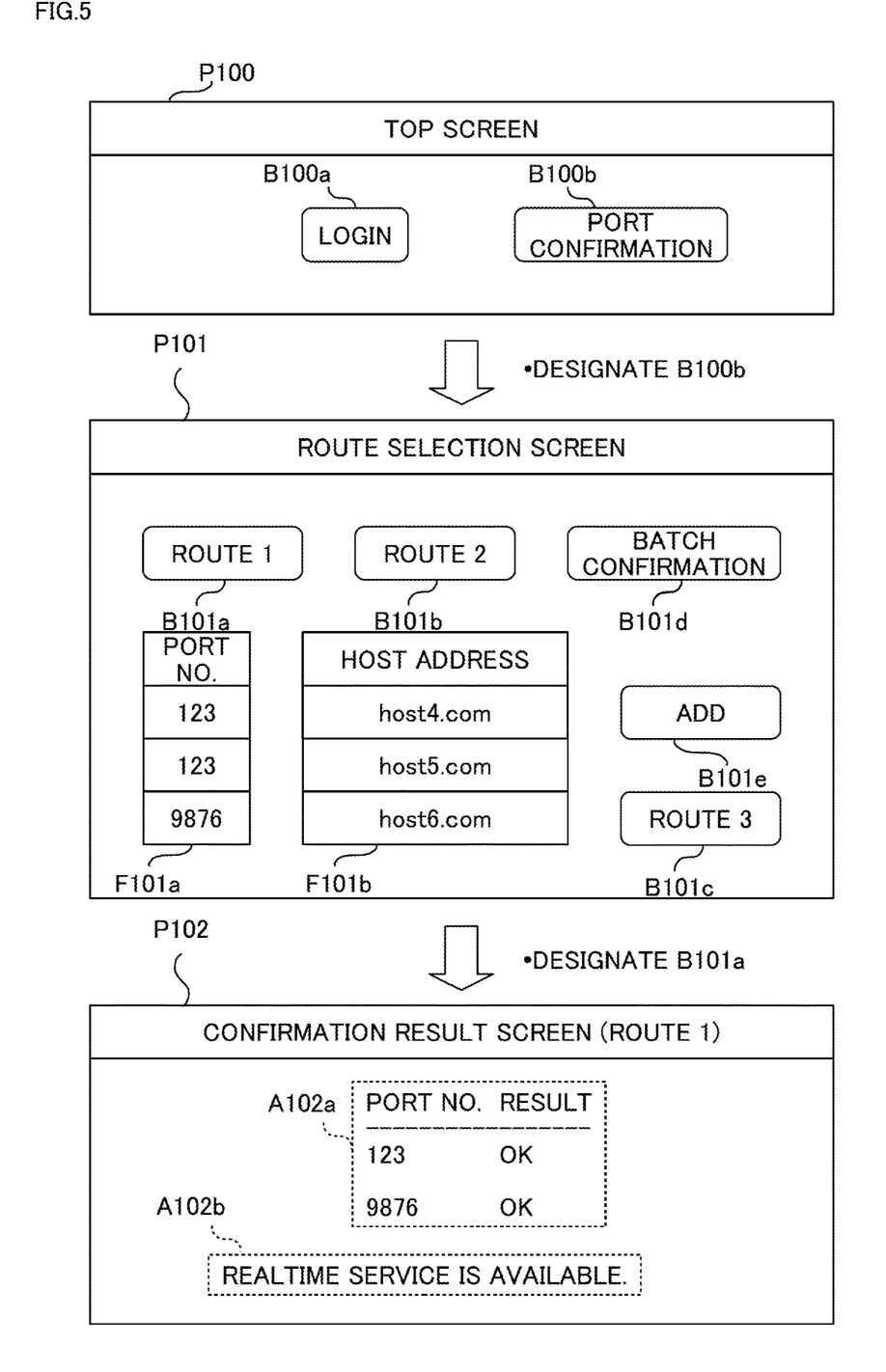
FIG. 5 is a view illustrating screen example to be displayed in the information processing of the present embodiment.

When the user designates a predetermined uniform resource locator (URL) using the input portion 13, the client terminal 10 displays a screen P100 (FIG. 5). The screen P100 is a top screen.

As illustrated in FIG. 5, the screen P100 includes buttons B100a and B100b.

When the user designates the button "LOGIN" B100a using the input portion 13, the client terminal 10 displays a screen for inputting a login ID and a password required for login to the support service provided by the host server 40.

When the user designates the button "PORT CONFIRMATION" B100b using the input portion 13, the client terminal 10 displays a screen P101. The screen P101 is a route selection screen.

The screen P101 includes input fields F101a and F101b and buttons B101a to B101e.

When the user designates the button "ROUTE 1" B101a using the input portion 13, the client terminal 10 performs test access on the first route (FIG. 4A). After the test access is finished, the client terminal 10 displays a screen P102. The screen P102 is a confirmation result screen of the first route (FIG. 4A).

The screen P102 includes areas A102a and A102b.

The port numbers defined by the first script and confirmation results with the respective port numbers are displayed at the area A102a. The confirmation results indicate availability of test access to the host servers 40 corresponding to the host addresses defined by the first script with the port numbers defined by the first script.

A message based on the confirmation results is displayed at the area A102b.

Figure 6:
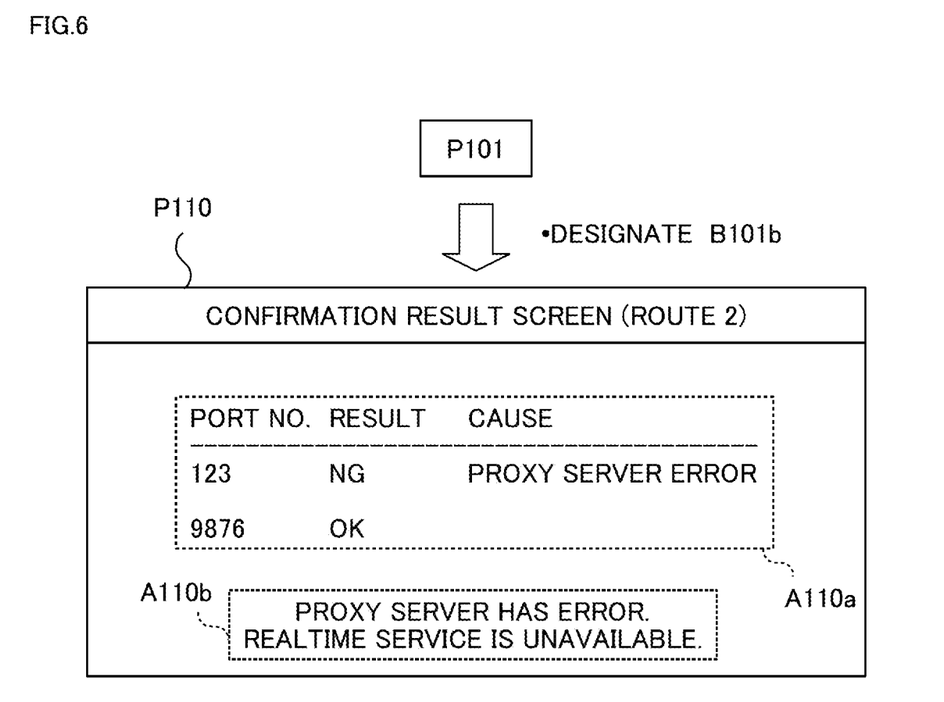
FIG. 6 is a view illustrating screen example to be displayed in the information processing of the present embodiment.

When the user designates the button "ROUTE 2" B101b using the input portion 13, the client terminal 10 performs test access on the second route (FIG. 4B). After the test access is finished, the client terminal 10 displays a screen P110 (FIG. 6). The screen P110 is a confirmation result screen of the second route (FIG. 4B).

As illustrated in FIG. 6, the screen P110 includes areas A110a and A110b. The port numbers defined by the second script, confirmation results of the respective port numbers, and a cause when each confirmation result is "NG" are displayed at the area A110a. The confirmation results indicate availability of test access to the host servers 40 corresponding to the host addresses defined by the second script with the port numbers defined by the second script.

A message based on the confirmation results is displayed at the area A110b.

When the user designates the button "ADD" B101e using the input portion 13, an input line for the input fields F101a and F101b (a combination of fields for a port number and a host address) is added.

When the user designates the button "ROUTE 3" B101c using the input portion 13, the client terminal 10 performs test access on the third route (FIG. 4C) based on information input at the input fields F101a and F101b. After the test access is finished, the client terminal 10 displays a screen P120. The screen P120 is a confirmation result screen of the third route (FIG. 4C).

Figure 7:
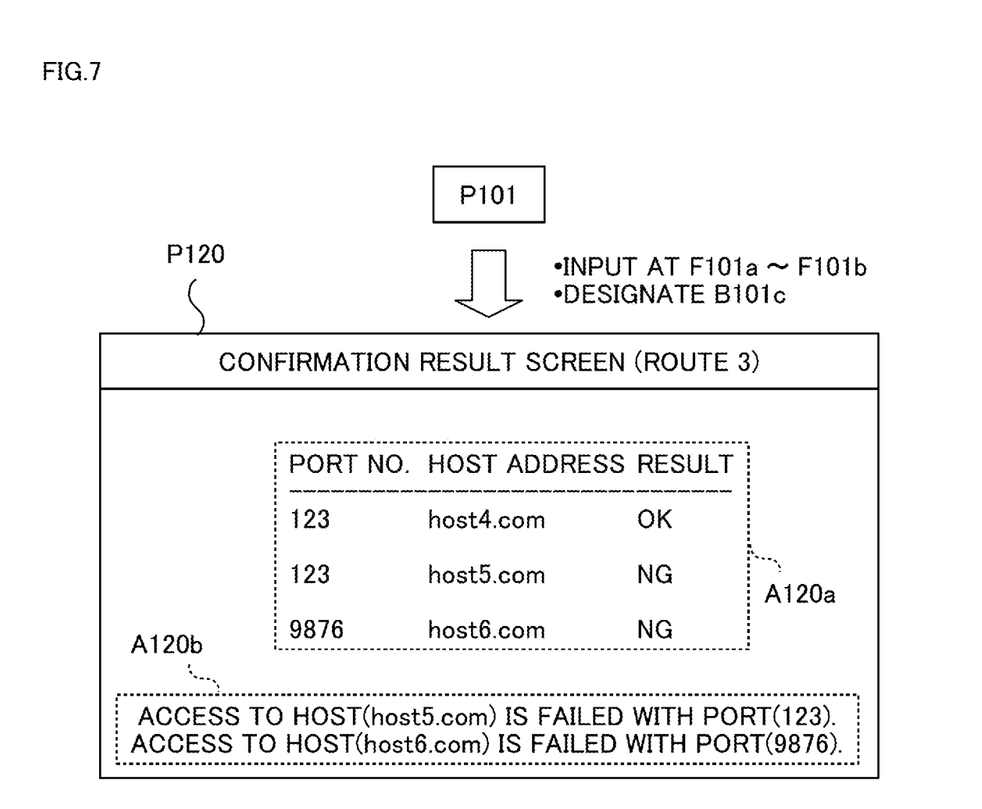
FIG. 7 is a view illustrating screen example to be displayed in the information processing of the present embodiment.

As illustrated in FIG. 7, the screen P120 includes areas A120a and A120b. The port numbers designated by the user, host addresses designated by the user, and confirmation results of respective combinations of the port numbers and the host addresses are displayed at the area A120a. The confirmation results indicate availability of test access to the host servers 40 corresponding to the host addresses designated by the user with the port numbers designated by the user.

A message based on the confirmation results is displayed at the area A120b.

Figure 8:
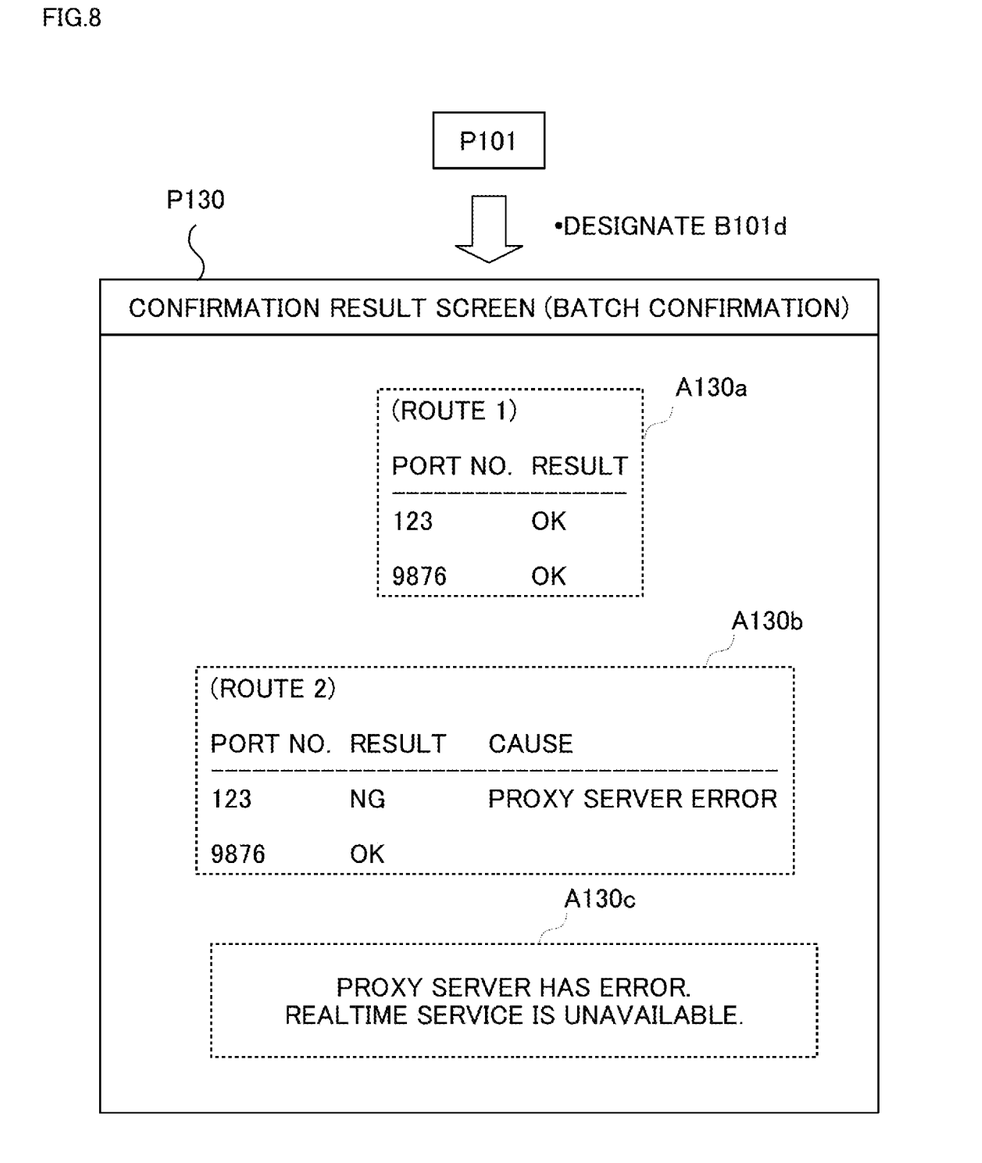
FIG. 8 is a view illustrating screen example to be displayed in the information processing of the present embodiment.

When the user designates the button "BATCH CONFIRMATION" B101d (FIG. 5) using the input portion 13, the client terminal 10 performs test accesses to both the first route (FIG. 4A) and the second route (FIG. 4B). After the test accesses are finished, the client terminal 10 displays a screen P130 (FIG. 8). The screen P130 is a confirmation result screen when the first route (FIG. 4A) and the second route (FIG. 4B) are collectively confirmed.

As illustrated in FIG. 8, the screen P130 includes areas A130a to A130c. Similarly to the area A102a (FIG. 5), the port numbers defined by the first script and confirmation results of the respective port numbers are displayed at the area A130a. Similarly to the area A110a (FIG. 5), the port numbers defined by the second script, confirmation results of the respective port numbers, and a cause when each confirmation result is "NG" are displayed at the area A130b.

Similarly to the area A102b (FIG. 5) and the area A110b (FIG. 6), a message based on the confirmation results is displayed at the area A130c.

5. Information Processing (FIGS. 9 to 12)

Description will be provided on information processing of the present embodiment.

Owing to that the CPUs 12, 22, 32, and 42 in FIG. 2 execute application programs stored in the storage devices 11, 21, 31, and 41, the information processing described below is actualized.

Figure 9:
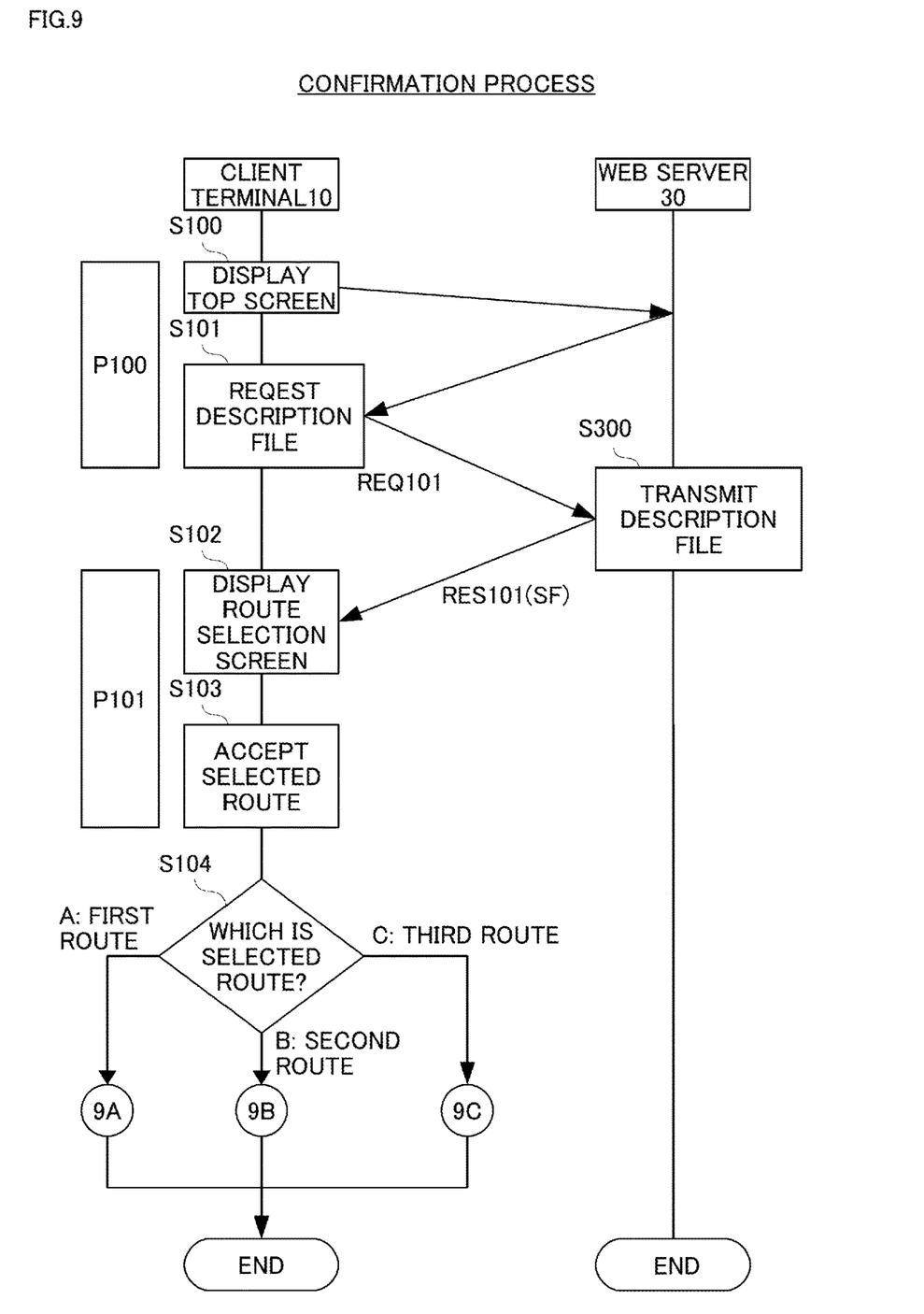
FIG. 9 is a sequence diagram of a confirmation process of the present embodiment.

5-1. Confirmation Process (FIG. 9)

Description will be provided on a confirmation process of the present embodiment. FIG. 9 is a sequence diagram of the confirmation process of the present embodiment.

The client terminal 10 displays the top screen (S100).

Specifically, when a user designates a predetermined URL using the input portion 13, the CPU 12 communicates with the web server 30 to display the screen P100 on the the display 14 (FIG. 5).

The client terminal 10 requests a description file (S101).

Specifically, when the user designates the button "PORT CONFIRMATION" B100b using the input portion 13, the CPU 12 transmits to the web server 30 a request REQ101 requesting transmission of the description file.

The web server 30 transmits the description file (S300).

Specifically, the CPU 32 transmits, to the client terminal 10, a response RES101 corresponding to the request REQ101. The response RES101 includes the description file SF.

The client terminal 10 displays the route selection screen (S102).

Specifically, the CPU 12, on the display 14, displays the screen P101 (FIG. 5) based on an HTML code of the description file SF included in the response RES101.

The client terminal 10 accepts a selected route (S103).

Figure 10:
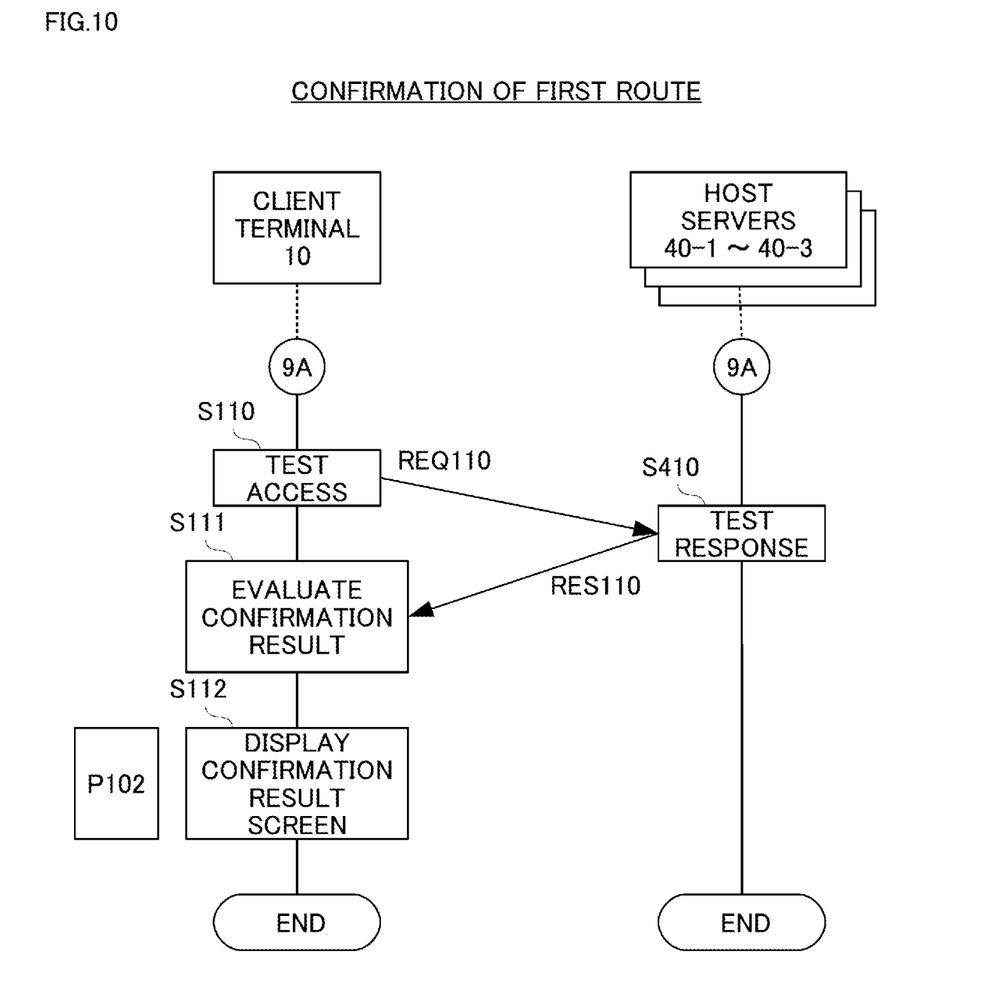
FIG. 10 is a sequence diagram of confirmation of a first route of the present embodiment.

Specifically, when the user designates the button "ROUTE 1" B101a (FIG. 5) using the input portion 13, the CPU 12 accepts the first route (FIG. 4A) as the selected route. In this case (A at S104), it proceeds to confirmation of the first route (FIG. 10).

Figure 11:
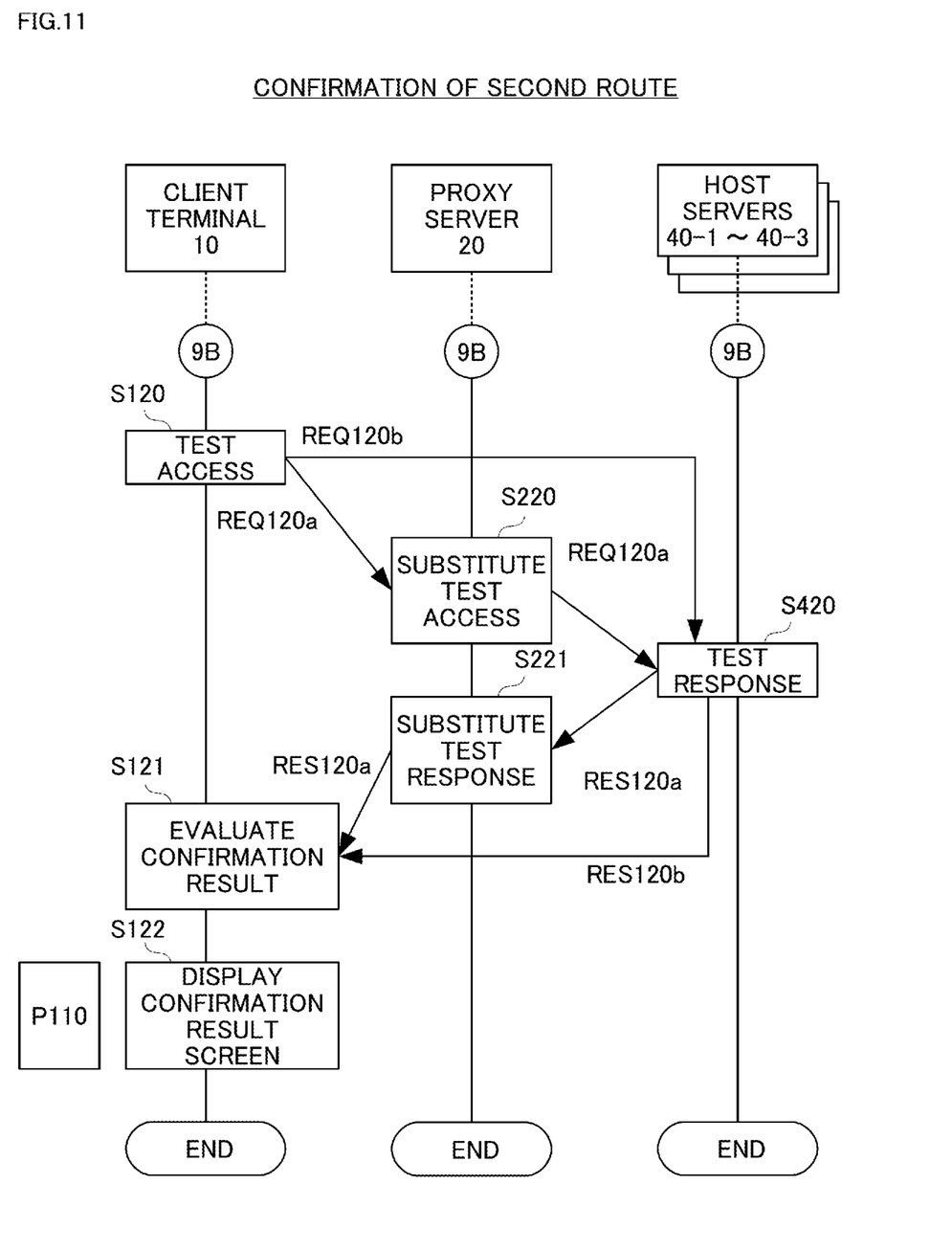
FIG. 11 is a sequence diagram of confirmation of a second route of the present embodiment.

When the user designates the button "ROUTE 2" B101b (FIG. 5) using the input portion 13, the CPU 12 accepts the second route (FIG. 4B) as the selected route. In this case (B at S104), it proceeds to confirmation of the second route (FIG. 11).

Figure 12:
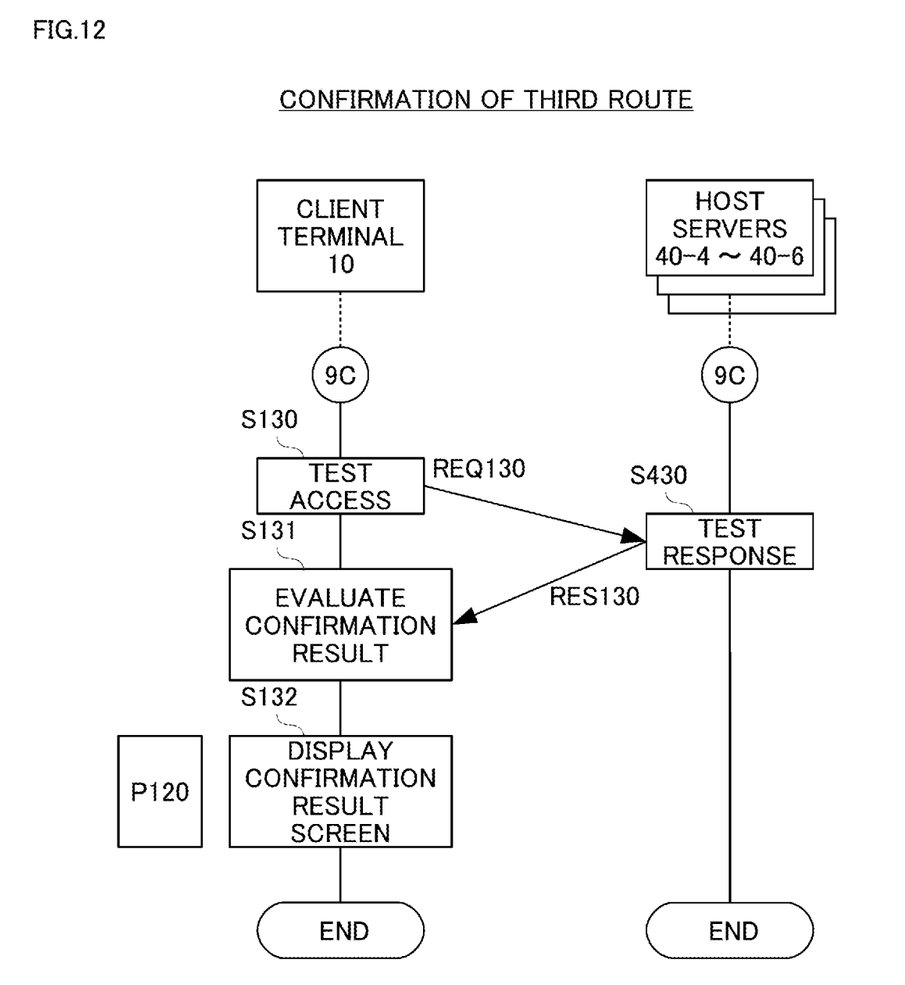
FIG. 12 is a sequence diagram of confirmation of a third route of the present embodiment.

When the user inputs information at the input fields F101a and F101b (FIG. 5) and designates the button "ROUTE 3" B101c (FIG. 5) using the input portion 13, the CPU 12 accepts the third route (FIG. 4C) as the selected route. In this case (C at S104), it proceeds to confirmation of the third route (FIG. 12).

5-2. Confirmation of First Route (FIG. 10)

Description will be provided on confirmation of the first route of the present embodiment. FIG. 10 is a sequence diagram of confirmation of the first route of the present embodiment.

The client terminal 10 performs test access (S110).

Specifically, the CPU 12 transmits, to the host server 40-1 defined by the first script of the description file SF, a request REQ110 for test access with the port number defined by the first script.

The CPU 12 transmits, to the host server 40-2 defined by the first script, the request REQ110 for test access with the port number defined by the first script.

The CPU 12 transmits, to the host server 40-3 defined by the first script, the request REQ110 for test access with the port number defined by the first script.

The host servers 40-1 to 40-3 perform test response (S410), respectively.

Specifically, when the request REQ110 has been received, the CPU 42 of each host server 40 transmits to the client terminal 10 a response RES110 corresponding to the request REQ110.

On the other hand, when the request REQ110 has not been received, the CPU 42 of each host server 40 does not transmit the response RES110.

The client terminal 10 evaluates the confirmation results (S111).

Specifically, when the response RES110 has been received within a predetermined time period after transmission of the request REQ110 at S110, the CPU 12 determines that test access to the host server 40 being a destination of the request REQ110 has succeeded.

On the other hand, when the response RES110 has not been received within the predetermined time period after transmission of the request REQ110 at S110, the CPU 12 determines that test access to the host server 40 being a destination of the request REQ110 has failed.

Further, when the response RES110 indicating a failure has been received from the host server 40, the CPU 12 determines that test access to the host server 40 being a destination of the request REQ110 has failed.

The client terminal 10 displays the confirmation result screen (S112).

Specifically, the CPU 12, on the display 14, displays the screen based on the evaluation result at S111 (e.g., the screen P102 in FIG. 5).

5-3. Confirmation of Second Route (FIG. 11)

Description will be provided on confirmation of the second route of the present embodiment. FIG. 11 is a sequence diagram of confirmation of the second route of the present embodiment.

The client terminal 10 performs test access (S120).

Specifically, the CPU 12 transmits, to the proxy server 20 set on a browser, a request REQ120b for test access to the host servers 40-1 and 40-2 defined by the second script with the port numbers defined by the second script of the description file SF.

The CPU 12 transmits, to the host server 40-3 defined by the second script, the request REQ120b for test access with the port number defined by the second script.

The proxy server 20 performs substitute test access (S220).

Specifically, the CPU 22 transmits, to the host servers 40-1 and 40-2 defined by the second script, a request REQ120a transmitted at S120.

The host servers 40-1 to 40-3 perform test response (S420), respectively.

Specifically, when the request REQ120b has been received, the CPU 42 of each host server 40 transmits to the client terminal 10 a response RES120b corresponding to the request REQ120b.

When the request REQ120a has been received, the CPU 42 transmits to the proxy server 20 a response RES120a corresponding to the request REQ120a.

On the other hand, when the request REQ120a or REQ120b has not been received, the CPU 42 does not transmit the response RES120a or RES120b.

The proxy server 20 performs substitute test response (S221).

Specifically, when the response RES120a has been received, the CPU 22 transmits the response RES120a to the client terminal 10 that has transmitted the request REQ120a. On the other hand, when the request REQ120a has not been received, the CPU 22 does not transmit the response RES120a.

The client terminal 10 evaluates the confirmation results (S121).

Specifically, when the response RES120a or RES120b has been received within a predetermined time period after transmission of the request REQ120a or REQ120b at S120, the CPU 12 determines that the test access to the host server 40 being a destination of the request REQ120a or REQ120b has succeeded.

On the other hand, when the response RES120a or RES120b has not been received within the predetermined time period after transmission of the request REQ120a or REQ120b at S120, the CPU 12 determines that test access to the host server 40 being a destination of the request REQ120a or REQ120b has failed.

Further, when the response RES120a or RES120b indicating a failure has been received from at least either the proxy server 20 or the host server 40, the CPU 12 determines that test access to the host server 40 being a destination of the request REQ120a or REQ120b has failed.

The client terminal 10 performs displaying of the confirmation result screen (S122).

Specifically, the CPU 12, on the display 14, displays the screen based on the evaluation result at S121 (e.g., the screen P110 in FIG. 6).

5-4. Confirmation of Third Route (FIG. 12)

Description will be provided on confirmation of the third route of the present embodiment. FIG. 12 is a sequence diagram of confirmation of the third route of the present embodiment.

The client terminal 10 performs test access (S130).

Specifically, when the user inputs information at the input fields F101a and F101b using the input portion 13 and designates the button "ROUTE 3" B101c, the CPU 12 transmits, to the host server 40-4 (host address: "host4.com") input at the input field F101b, a request REQ130 for test access with the port number "123" input at the input field F101a.

Further, the CPU 12 transmits, to the host server 40-5 (host address: "host5.com") input at the input field F101b, the request REQ130 for test access with the port number "123" input at the input field F101a.

Further, the CPU 12 transmits, to the host server 40-6 (host address: "host6.com") input at the input field F101b, the request REQ130 for test access with the port number "9876" input at the input field F101a.

The host servers 40-4 to 40-6 perform test response (S430), respectively.

Specifically, when the request REQ130 has been received, the CPU 42 of each host server 40 transmits to the client terminal 10 a response RES130 corresponding to the request REQ130.

On the other hand, when the request REQ130 has not been received, the CPU 42 does not transmit the response RES130.

The client terminal 10 evaluates the confirmation results (S131).

Specifically, when the response RES130 has been received within a predetermined time period after transmission of the request REQ130 at S130, the CPU 12 determines that test access to the host server 40 being a destination of the request REQ130 has succeeded.

On the other hand, when the response RES130 has not been received within the predetermined time period after transmission of the request REQ130 at S130, the CPU 12 determines that test access to the host server 40 being a destination of the request REQ130 has failed.

Further, when the response S130 indicating a failure has been received from the host server 40, the CPU 12 determines that test access to the host server 40 being a destination of the request REQ130 has failed.

The client terminal 10 displays the confirmation result screen (S132).

Specifically, the CPU 12, on the display 14, displays the screen based on the evaluation result at S131 (e.g., the screen P120 in FIG. 7).

6. Summary

The present embodiment is summarized as follows.

As described above, the web server 30 is configured to accept a request from the client terminal 10. The web server 30 includes the storage device 31 (an example of a storage) to store the description file SF including the script to cause the client terminal 10 to perform the confirmation process to confirm availability of access to specific host servers 40-1 to 40-3 with specific port numbers P1 and P2, and a unit (e.g., the CPU 32 to perform a process at S300) configured to transmit the description file SF stored in the storage device 31 to the client terminal 10 based on the request REQ101.

The client terminal 10 is configured to access the web server 30. The client terminal 10 includes a unit (e.g., the CPU 12 to perform a process at S101) configured to retrieve the description file SF from the web server 30, a unit (e.g., the CPU 12 to perform a process at S110 to S111, a process at S120 to S121, or a process at S130 to S131) configured to perform the confirmation process based on the description file SF, and the display 14 configured to display a result of the confirmation process.

According to the above, it can be facilitated to confirm availability of access from the client terminal 10 to a specific host server 40.

Further, it can also be facilitated to confirm availability of access from the client terminal 10 to an arbitrary host server 40.

Further, the client terminal 10 confirms access availability in accordance with the description file SF provided by the web server 30. That is, the client terminal 10 that confirmed access availability is capable of retrieving the description file SF. In other words, the client terminal 10 that confirmed access availability is capable of accessing the web server 30. Thus, it is possible to easily acknowledge whether or not the client terminal 10 can access the web server 30 (i.e., internet circumstances of a user).

7. Other modified examples

In the above embodiment, description is provided on the example that information processing is actualized by the web browser, installed in the client terminal 10, with https communication. However, the present embodiment is not limited thereto.

For example, information processing in the above embodiment can be actualized by a dedicated application (an application other than a browser) installed in the client terminal 10 with https communication.

Further, the communication protocol in the above embodiment is not limited to https communication.

In the above embodiment, the client terminal 10 and the proxy server 20 may be connected to an intranet, and the web server 30 and the host server 40 may be connected to the internet.

In this case, a firewall may be set at the intranet.

In a case that a firewall is set at the intranet, the client terminal 10 may determine whether a cause of a failure of test access exists in the firewall or the host server 40.

The communication route in the above embodiment may further include a fourth route. The fourth route includes test access to the host server 40-4 designated by a user through the proxy server 20 with the port number P3 designated by the user, test access to the host server 40-5 designated by the user through the proxy server 20 with the port number P3 designated by the user, and test access to the host server 40-6 designated by the user with the port number P4 designated by the user without the proxy server 20.

In the above, although description is provided in detail on the embodiments of the present invention, the scope of the present invention is not limited to the above embodiments. Further, the embodiments may be modified or varied variously without departing from the scope of the present invention. Further, the embodiments and modified examples thereof described above may be combined.

REFERENCE SIGNS LIST

1: Information processing system
10: Client terminal
11: Storage device
12: CPU
13: Input portion
14: Display
15: Communication interface
20: Proxy server 21: Storage device
22: CPU
23: Communication interface
30: Web server
31: Storage device
32: CPU
33: Communication interface
40 (40-1~40-6): Host server
41: Storage device
42: CPU
43: Communication interface

The invention claimed is:

1. An information processing system comprising:
a client terminal;
a host server; and
a server having a storage configured to store a description file including a script, in which the host server and a predetermined port number are defined, and a transmitter configured to transmit, without being routed through the host server, the description file stored in the storage to the client terminal based on a request from the client terminal, the request being received without being routed through the host server,
wherein the client terminal performs a confirmation process to confirm availability of access to the host server with the predetermined port number based on the description file retrieved from the server without being routed through the host server, and the client terminal displays a result of the confirmation process.

2. An information processing system comprising:
a client terminal;
a host server; and
a server comprising:
a storage configured to store a description file including a script in which the host server and a predetermined port number are defined, and
a transmitter configured to transmit, without being routed through the host server, the description file stored in the storage to the client terminal based on a request from the client terminal, the request being received without being routed through the host server,
wherein the client terminal performs a confirmation process to confirm availability of access to the host server with the predetermined port number based on the description file retrieved from the server, without being routed through the host server, and the client terminal displays a result of the confirmation process.

* * * * *